(12) United States Patent
Sun et al.

(10) Patent No.: US 10,148,219 B2
(45) Date of Patent: Dec. 4, 2018

(54) SCISSOR JACK MULTI-DRIVE SINGLE-SHAFT TRACKING SOLAR SUPPORT

(71) Applicant: WUXI HAOSOLAR TECHNOLOGY CO., LTD., Yixing, Jiangsu (CN)

(72) Inventors: Yingguang Sun, Jiangsu (CN); Haiping Zhang, Jiangsu (CN)

(73) Assignee: WUXI HAOSOLAR TECHNOLOGY CO., LTD., Yixing, Jiangsu (CN)

(*) Notice: Subject to any disclaimer, the term of this patent is extended or adjusted under 35 U.S.C. 154(b) by 56 days.

(21) Appl. No.: 14/910,896

(22) PCT Filed: Sep. 26, 2013

(86) PCT No.: PCT/CN2013/001165
§ 371 (c)(1),
(2) Date: Mar. 11, 2016

(87) PCT Pub. No.: WO2015/017951
PCT Pub. Date: Feb. 12, 2015

(65) Prior Publication Data
US 2016/0190980 A1  Jun. 30, 2016

(30) Foreign Application Priority Data
Aug. 8, 2013 (CN) .................. 2013 2 0138445 U

(51) Int. Cl.
*H01L 31/042* (2014.01)
*H02N 6/00* (2006.01)
(Continued)

(52) U.S. Cl.
CPC .......... *H02S 20/32* (2014.12); *F24S 30/425* (2018.05); *H02S 20/10* (2014.12); *H02S 20/30* (2014.12);
(Continued)

(58) Field of Classification Search
CPC .......... H02S 20/32; H02S 20/10; H02S 20/30; F24J 2/541; F24J 2002/5468; F24J 2002/5455; Y02E 10/47
(Continued)

(56) References Cited

U.S. PATENT DOCUMENTS

2006/0044511 A1* 3/2006 Mackamul ............. F16M 11/10
353/3

FOREIGN PATENT DOCUMENTS

CN 101619896 A 1/2010
EP 2154449 A2 2/2010
(Continued)

OTHER PUBLICATIONS

English machine translation of Korean application KR20120000106, published in Korean as KR 20-0462861 Y1. (Year: 2017).*

*Primary Examiner* — Angelo Trivisonno
(74) *Attorney, Agent, or Firm* — Novick, Kim & Lee, PLLC; Bin Lu

(57) ABSTRACT

A multi-scissor jack-operated single-shaft solar tracking apparatus. A scissor jack is provided at regular intervals on a rotation beam of the single-shaft tracking solar support, thereby forming a multi-drive rotation. Lifting screw of each scissor jack is connected by a drive shaft so as to be lifted in synchronization. One of the scissor jacks can be driven by a motor, and the lifting screws of the other scissor jacks are driven by the transmission shaft, thereby synchronously driving the rotation beam of the single-shaft tracking solar support to rotate. The scissor jacks can be driven by manpower, in order that the angle of the tracking solar support can be adjusted by hand.

3 Claims, 6 Drawing Sheets

(51) Int. Cl.
  *H02S 20/32* (2014.01)
  *H02S 20/30* (2014.01)
  *H02S 20/10* (2014.01)
  *F24S 30/425* (2018.01)
  *F24S 30/00* (2018.01)

(52) U.S. Cl.
  CPC .... *F24S 2030/132* (2018.05); *F24S 2030/136* (2018.05); *Y02E 10/47* (2013.01)

(58) Field of Classification Search
  USPC .......................................................... 136/246
  See application file for complete search history.

(56) References Cited

FOREIGN PATENT DOCUMENTS

| | | | |
|---|---|---|---|
| FR | 2533288 | B1 | 5/1989 |
| KR | 20-0462026 | Y | 8/2012 |
| KR | 20-0462808 | Y | 10/2012 |
| KR | 20-0462861 | Y | 10/2012 |
| KR | 200462861 | Y1 * | 10/2012 |

* cited by examiner

SCISSOR JACK MULTI-DRIVE SINGLE-SHAFT TRACKING SOLAR SUPPORT

FIELD OF THE INVENTION

The present invention relates to the field of solar energy applications. In particular, the present invention relates to the need to track the movement of the sun by an apparatus bearing a mirror-based solar power system or a solar thermal power generation device.

BACKGROUND OF THE INVENTION

Currently an axis-based solar tracking device is rotated by a drive gear or a pushing rod that acts on a single point. For example, a drive gear or a pushing rod directs a solar tracking device to follow the movement of the sun by acting on a rotation axis at one end or in the middle. Under the wind, the rotation axis would shake. Strong wind can shake the rotation axis vigorously to cause damage. In order to reduce the shaking, the long end of rotation axis of a solar tracking device is secured by brackets. These brackets introduces the need to increase the force of the push rod or the drive gear, which demands more power consumption.

There is a need to develop a cost-effective, highly adjustable yet strong apparatus for maximizing solar energy utilization.

SUMMARY OF THE INVENTION

This invention provides a strong single-axis solar tracking apparatus that increases wind resistance and reduces power consumption. More specifically, the present invention provides a multi-scissor jack-operated single-shaft solar tracking apparatus.

The solar tracking apparatus includes a master scissor jack, one or more slave scissor jacks each, a drive shaft, a rotating beam having a plurality of support brackets, one or more photovoltaic modules each having one or more supporting beams, one or more rockers, and a plurality of supporting scaffolds.

The master scissor jack and slave scissor jack each have a lifting screw. They are individually fixated on the supporting scaffold. The master scissor jack can be driven manually or by a motor. The drive shaft connects the lifting screw of the master scissor jack and the lifting screw of the slave scissor jack. Thus, the master scissor jack and the slave scissor jack can be lifted in synchronization through the drive shaft. The rocker connects the rotating beam either to the master scissor jack or to the driven scissor jack. Thus, the master scissor jack and the slave scissor jack control the rotation of the rotating beam through the rocker. The rotating beam is secured by support brackets to the supporting scaffolds. The rotating beam is connected to the supporting beam thereby controlling the rotation of the photovoltaic module.

The solar tracking apparatus of the present invention can also include the master scissor jack that has an upper hinge and a lower hinge. The upper hinge is connected to the rocker, whereas the lower hinge of the master scissor jack is fixated on the supporting scaffold through a mounting bracket. The lifting screw of the master scissor jack is coupled with the drive shaft through a joint.

Yet, the solar tracking apparatus of the present invention can also include the slave scissor jack that has an upper hinge and a lower hinge. The upper hinge of the slave scissor jack is connected to the rocker, whereas the lower hinge of the slave scissor jack is fixated on the supporting scaffold through a mounting bracket. The lifting screw of the slave scissor jack is also coupled with the drive shaft through a joint.

As described above, the master scissor jack can be driven by a motor or by a man. The latter option enables the master scissor jack to be manually adjustable according to the solar direction.

The beneficial effects of the present invention are: the single-shaft solar tracking apparatus is driven by multi-pointed scissor jacks. Since the scissor jack provideds extremely heavy form of self-locking support, the rotating axis of the solar tracking apparatus described above overcomes the shaking problem in case of strong winds. The solar tracking apparatus of the present invention thus increases wind resistance and reduces power consumption. In addition, the low driving force of scissor jacks improves the reliability of the single-axis solar tracking and reduces manufacturing costs.

In this respect, before explaining the current embodiments of the multi-scissor jack-operated single-shaft solar tracking apparatus in detail, it is to be understood that the apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the purposes of the multi-scissor jack-operated single-shaft solar tracking apparatus described below. It is therefore imperative that the claims be regarded as including such equivalent constructions insofar as they do not depart from the spirit and scope of the multi-scissor jack-operated single-shaft solar tracking apparatus.

It is also to be understood that the phraseology and terminology employed herein are for purposes of description and should not be regarded as limiting.

BRIEF DESCRIPTION OF THE DRAWINGS

These drawings illustrate certain aspects of some of the embodiments of the present invention, and should not be used to limit or define the invention.

DETAILED DESCRIPTION

With reference now to the drawings, and in particular FIGS. 1 through 6 thereof, the principles and concepts of the multi-scissor jack-operated single-shaft solar tracking apparatus will be described.

Figure 1:
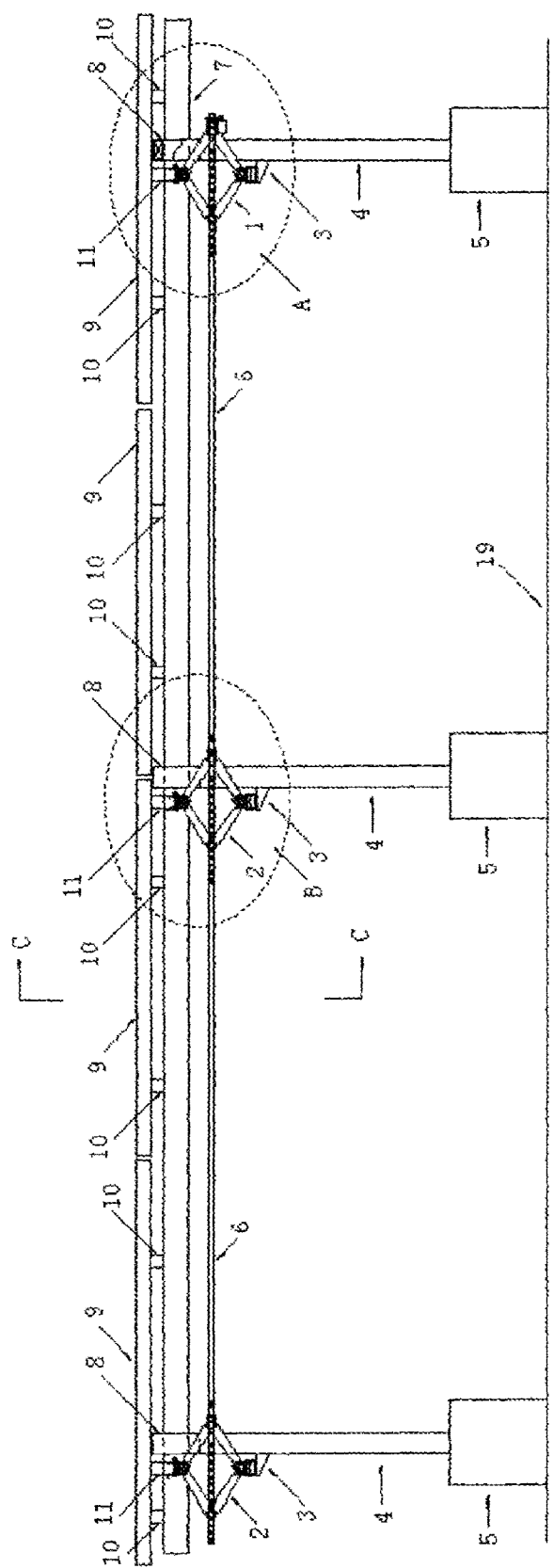
FIG. 1 is a schematic diagram of the present invention, the multi-scissor jack-operated single-shaft solar tracking apparatus.
Figure 3:
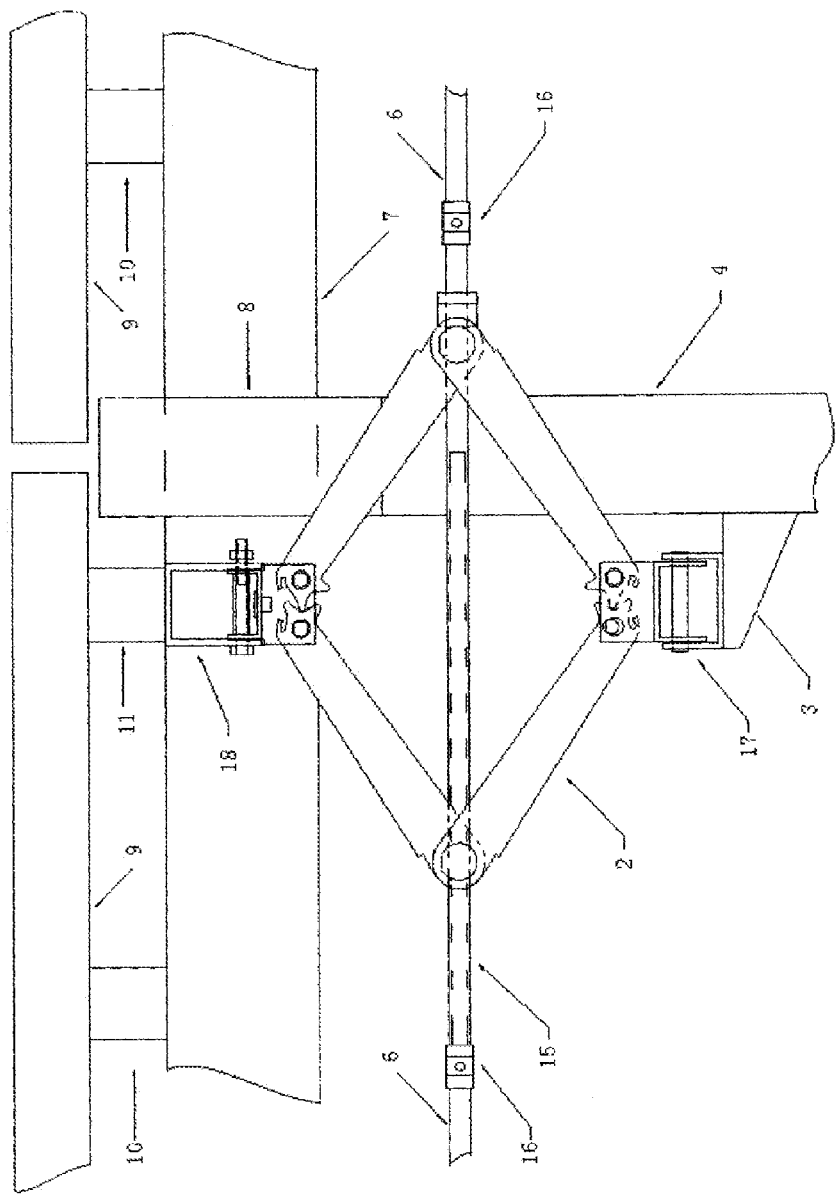
FIG. 3 is an enlarged view of part B in FIG. 1.

Referring to FIGS. 1 and 3, a master scissor jack 1 or a driven scissor jack 2 are supported by a mounting bracket 3, a scaffold 4 and a ground base 5. A drive shaft 6 connects a lifting screw 15 of the master scissor jack 1 and a lifting screw 15 of the slave scissor jack 2. A single-axis rotating beam 7 and a photovoltaic module 9 is connected through a support beam 10 so that the rotation of the photovoltaic module 9 is controlled by the rotating beam 7. A rocker 11 is attached to the rotating beam 7 and directs its rotation. The rotating beam 7 is secured to the scaffold 4 through a support bracket 8. An upper hinge 18, either of the master scissor jack 1 or of the slave scissor jack 2, is connected to the rocker 11. A lower hinge 17, either of the master scissor jack 1 or of the slave scissor jack 2, is connected to the mounting bracket 3. In addition, an electric motor 13 is driving the lifting screw 15 of master scissor jack 1 through a motor output gear 12, a lifting screw gear 14. The driving of the lifting screw 15 of master scissor jack 1 and that of the lifting screw 15 of the slave scissor jack 2 are coupled through the drive shaft 6 and a joint 16 that connects the drive shaft 6 and the lifting screw 15. Finally, 19 is ground and 20 is the sun.

Figure 2:
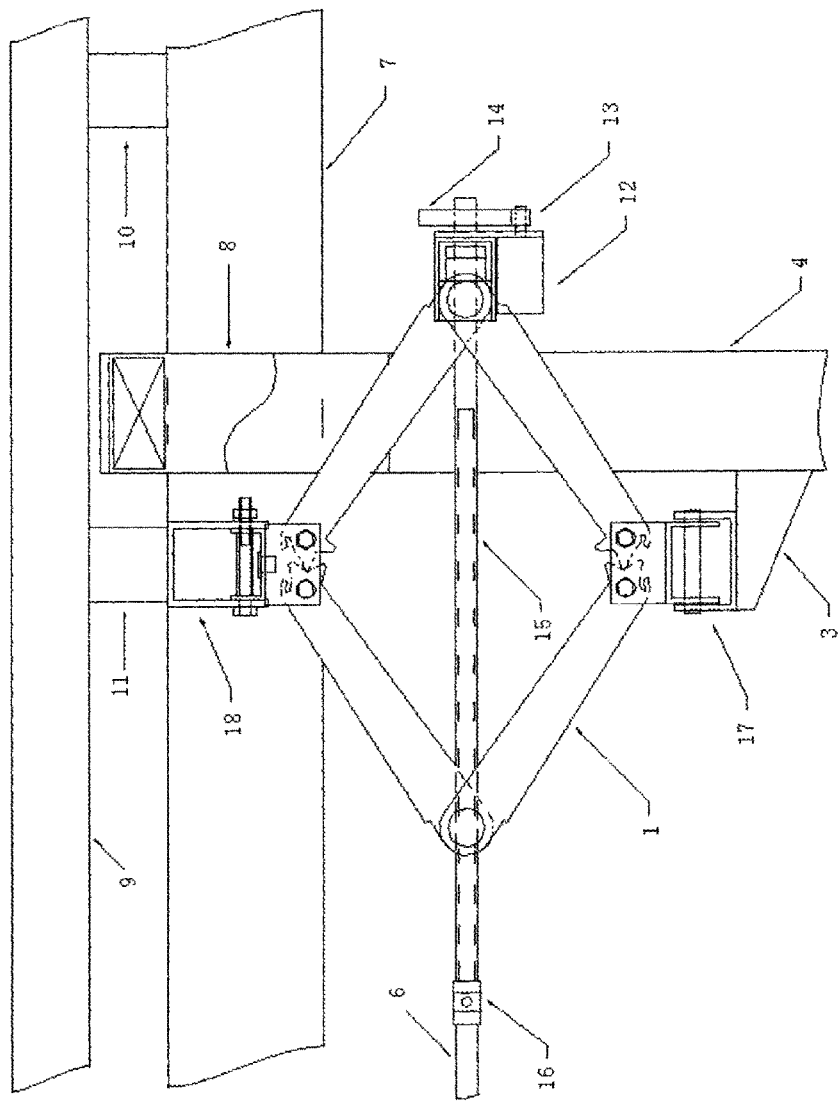
FIG. 2 is an enlarged view of part A in FIG. 1.

In the diagrams of the present invention, a scissor jack, i.e., a master scissor jack 1, achieves multi-point driving of a single-axis solar tracking apparatus. First, as illustrated in FIG. 2, the movement of the lifting screw 15 of master scissor jack 1 is directing the drive shaft 6. Then, as illustrated in FIG. 3, that movement of the drive shaft 6 is directing the lifting screw 15 of slave scissor jack 2. The joint 16 ensures the coupling of the drive shaft 6 and the lifting screw 15.

Figure 4:
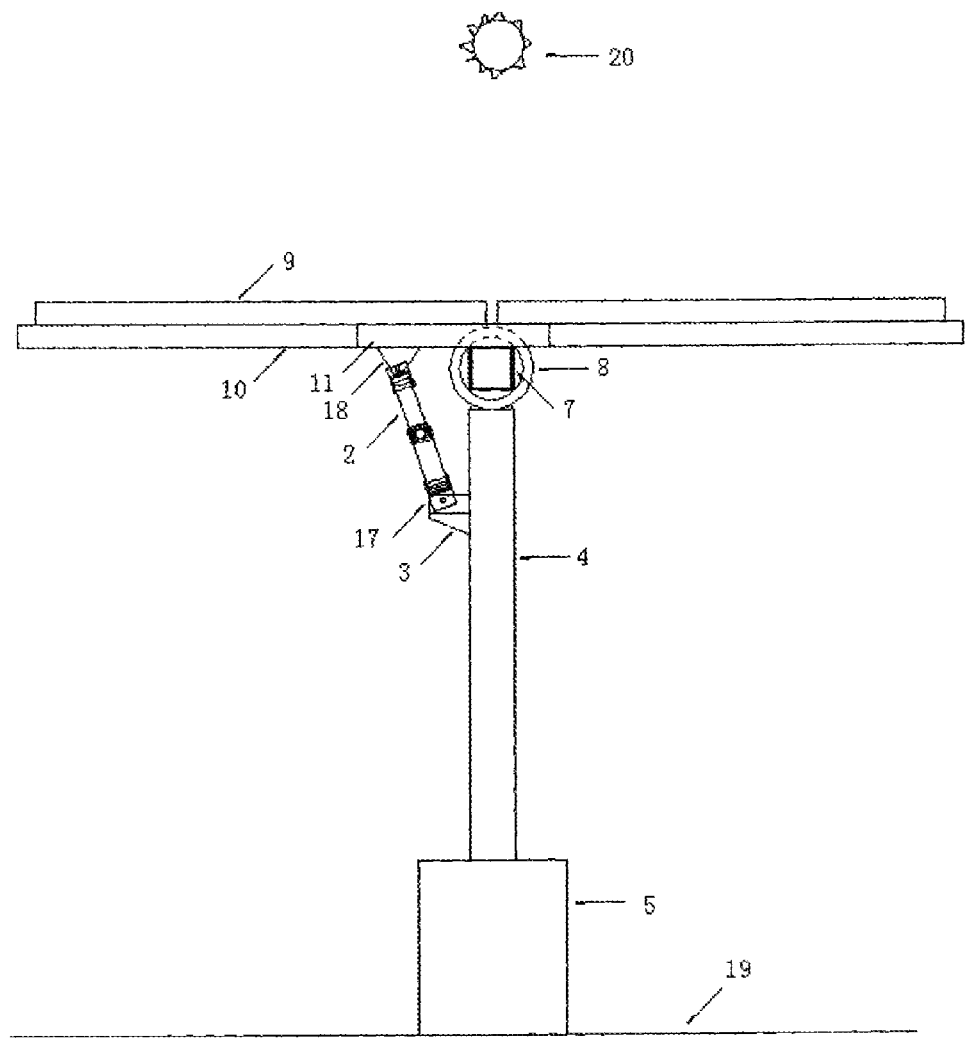
FIG. 4 is a view of direction C in FIG. 1.

FIG. 4, a view of direction C in FIG. 1, further illustrate how the lifting or retracting of the scissor jack is directing the rotation of rotating beam 7, which in turn, is directing the photovoltaic module 9 to face toward the sun 20.

Figure 5:
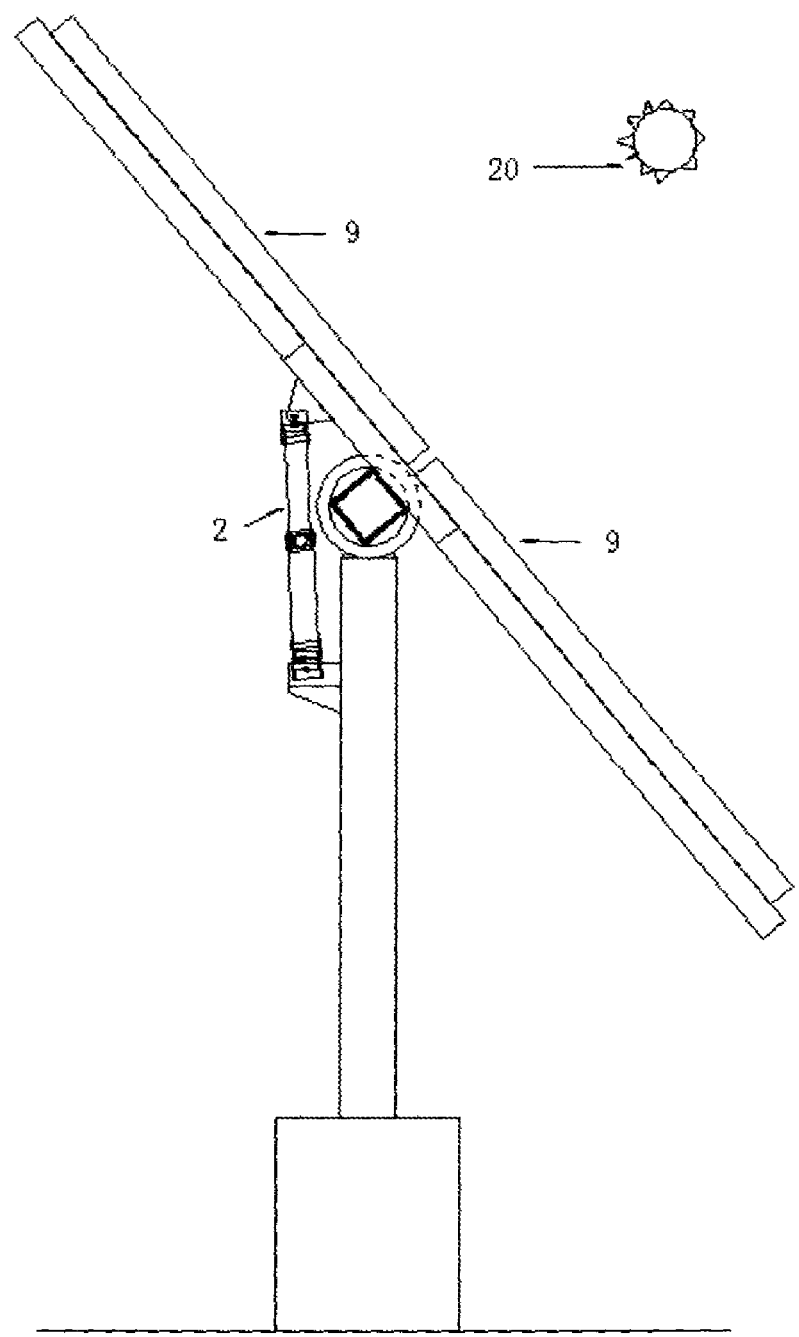
FIG. 5 is a schematic diagram of how the multi-scissor jack-operated single-shaft solar tracking apparatus is tracking the direction of the sun in one instance.

FIG. 5 shows that, with the multi-scissor jack-operated single-shaft solar tracking apparatus, when the master scissor jack and the slave scissor jack are lifted to the maximum length, the photovoltaic module 9 is facing toward the sun 20.

Figure 6:
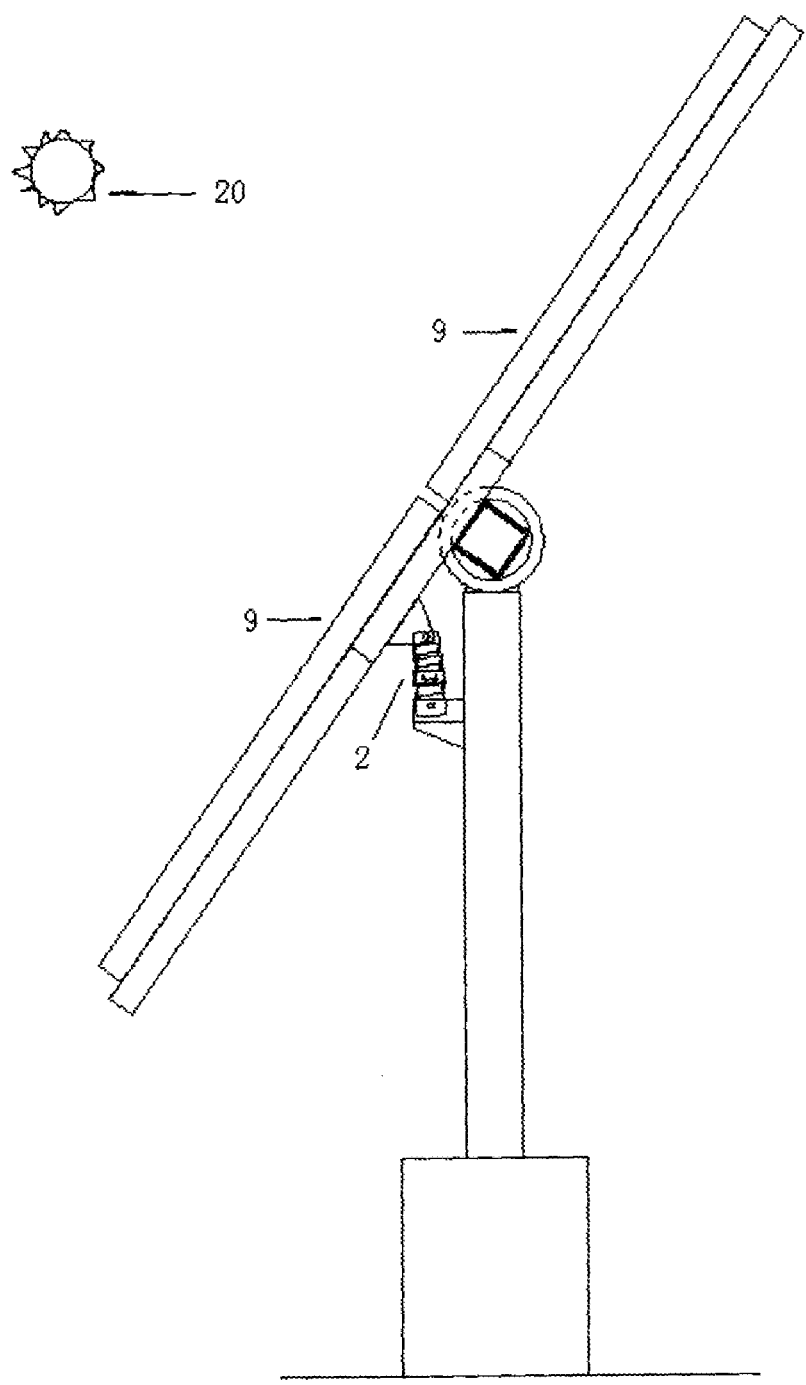
FIG. 6 is a schematic diagram of how the multi-scissor jack-operated single-shaft solar tracking apparatus is tracking the direction of the sun in another instance.

FIG. 6 shows that, in another instance with the multi-scissor jack-operated single-shaft solar tracking apparatus, when the master scissor jack and the slave scissor jack are retracted to the minimum length, the photovoltaic module 9 is also facing toward the sun 20.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Further, from the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A solar tracking apparatus comprising:
   a master scissor jack driven manually or by a motor, the master scissor jack having a lifting screw,
   two or more slave scissor jacks each having a lifting screw,
   a drive shaft connecting the lifting screw of the master scissor jack and the lifting screws of the two or more slave scissor jacks,
   a rotating beam having a plurality of support brackets,
   one or more photovoltaic modules each having one or more supporting beams,
   one or more rockers each connecting the rotating beam either to the master scissor jack or to the two or more slave scissor jacks, and
   a plurality of supporting scaffolds,
   wherein:
   the master scissor jack and the two or more slave scissor jacks are individually fixated on respective ones of the plurality of supporting scaffolds so that each jack is fixed to a different supporting scaffold;
   the rotating beam is secured by the plurality of support brackets to the plurality of supporting scaffolds;
   the master scissor jack and the two or more slave scissor jacks are lifted in synchronization through the drive shaft;
   the master scissor jack and the two or more slave scissor jacks control the rotation of the rotating beam through the one or more rockers;
   the rotating beam is connected to the one or more supporting beams thereby controlling the rotation of the one or more photovoltaic modules;
   a lower hinge of the master scissor jack is fixated on a respective one of the plurality of supporting scaffolds through a respective mounting bracket, the respective mounting bracket positioned below the rotating beam; and
   a lower hinge of each of the two or more slave scissor jacks is fixated on respective ones of the plurality of supporting scaffolds through a respective mounting bracket, the respective mounting bracket positioned below the rotating beam.

2. The solar tracking apparatus according to claim 1, wherein:
   an upper hinge of the master scissor jack is connected to one of the plurality of rockers; and
   the lifting screw of the master scissor jack is coupled with the drive shaft through a joint.

3. The solar tracking apparatus according to claim 1, wherein:
   an upper hinge of the slave scissor jack is connected to one of the plurality of rockers; and
   the lifting screw of the slave scissor jack is coupled with the drive shaft through a joint.

* * * * *